Patented Dec. 4, 1928.

1,694,155

UNITED STATES PATENT OFFICE.

HAROLD JOSEPH WHEATON, OF LOWER WALTON, NEAR WARRINGTON, ENGLAND, ASSIGNOR, BY MESNE ASSIGNMENTS, TO AMERICAN DOUCIL COMPANY, OF PHILADELPHIA, PENNSYLVANIA, A CORPORATION OF PENNSYLVANIA.

BASE-EXCHANGE COMPOUND AND PROCESS OF MAKING IT.

No Drawing. Application filed November 3, 1921, Serial No. 512,631, and in Great Britain July 5, 1921. Renewed May 4, 1928.

The object of this invention is to produce a new and efficient base-exchanging compound by a new and improved process.

According to the said invention the said base-exchanging compound is prepared by mixing a solution of sodium silicate and a solution of sodium aluminate under such conditions and in such proportions that a gel is produced which, when dried and washed, constitutes a product which is insoluble in water and is very satisfactory as regards porosity and absorptive power and general efficiency as a base-exchanging compound.

The new compound according to this invention can be made as follows, so that it contains between $Al_2O_3$, $4Na_2O$, $8SiO_2$ and $Al_2O_3$, $6Na_2O$, $14SiO_2$.

From four to six parts by weight of a solution of sodium silicate of about thirty degrees Twaddell are mixed with one part by weight of a solution of sodium aluminate of about twenty-five degrees Twaddell, the said solution of sodium silicate containing from 30 to 40 per cent of sodium silicate having a ratio of sodium to silica of one of sodium to from one to three and four-fifths of silica and the solution of sodium aluminate containing forty grammes of aluminium per litre, or thereabouts.

The gel thus produced is then dried and washed and a compound is obtained which has the aforesaid properties.

This invention is not limited to the precise details of the aforesaid example.

What I claim as my invention is:—

1. The manufacture of a base-exchanging compound by mixing a solution of sodium silicate of about 30° Twaddell, the proportion being from about 4 to 6 parts by weight, with about one part by weight of a solution of sodium aluminate of about 25° Twaddell and then in drying the gel which is produced from the entire mass of the mixed solutions and then in washing the dried product.

2. The manufacture of a new base-exchanging compound by mixing a solution of sodium silicate containing from 30 to 40 per cent of sodium silicate, having a ratio of one of sodium to from one to three and four-fifths of silica, and a solution of sodium aluminate containing about forty grammes of aluminium per litre.

3. A new base-exchanging compound which has been produced in accordance with claim 1.

4. A new base-exchanging compound which is insoluble in water, of great porosity, and absorptive power, and which contains between $Al_2O_3$, $4Na_2O$, $8SiO_2$, and $Al_2O_3$, $6Na_2O$, $14SiO_2$.

In testimony whereof I have signed my name to this specification.

HAROLD JOSEPH WHEATON.